Feb. 24, 1931. C. L. GANNAWAY 1,794,165
AUTOMOBILE LIFT
Filed Aug. 1, 1929 3 Sheets-Sheet 1
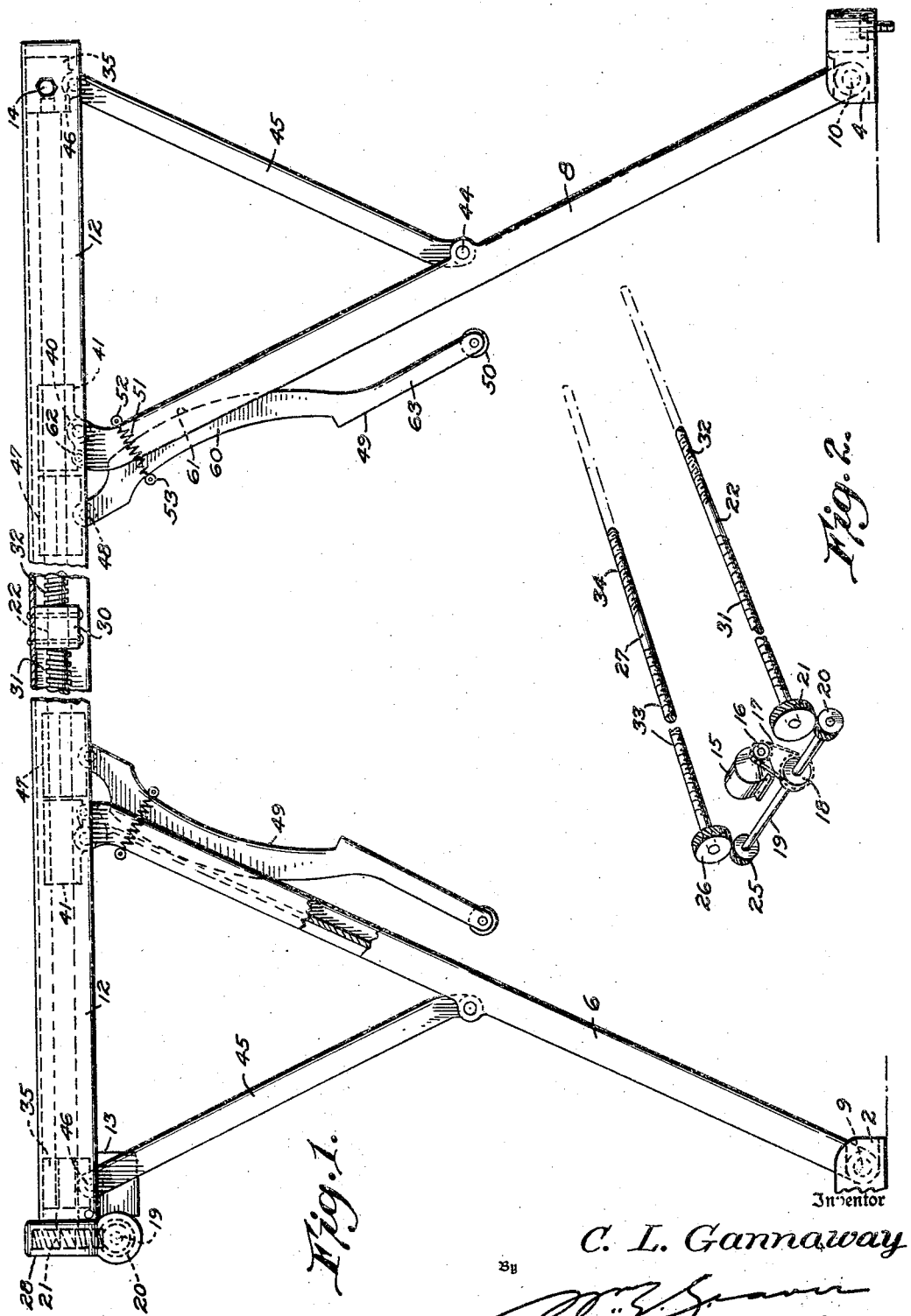
Inventor
C. L. Gannaway
Attorney

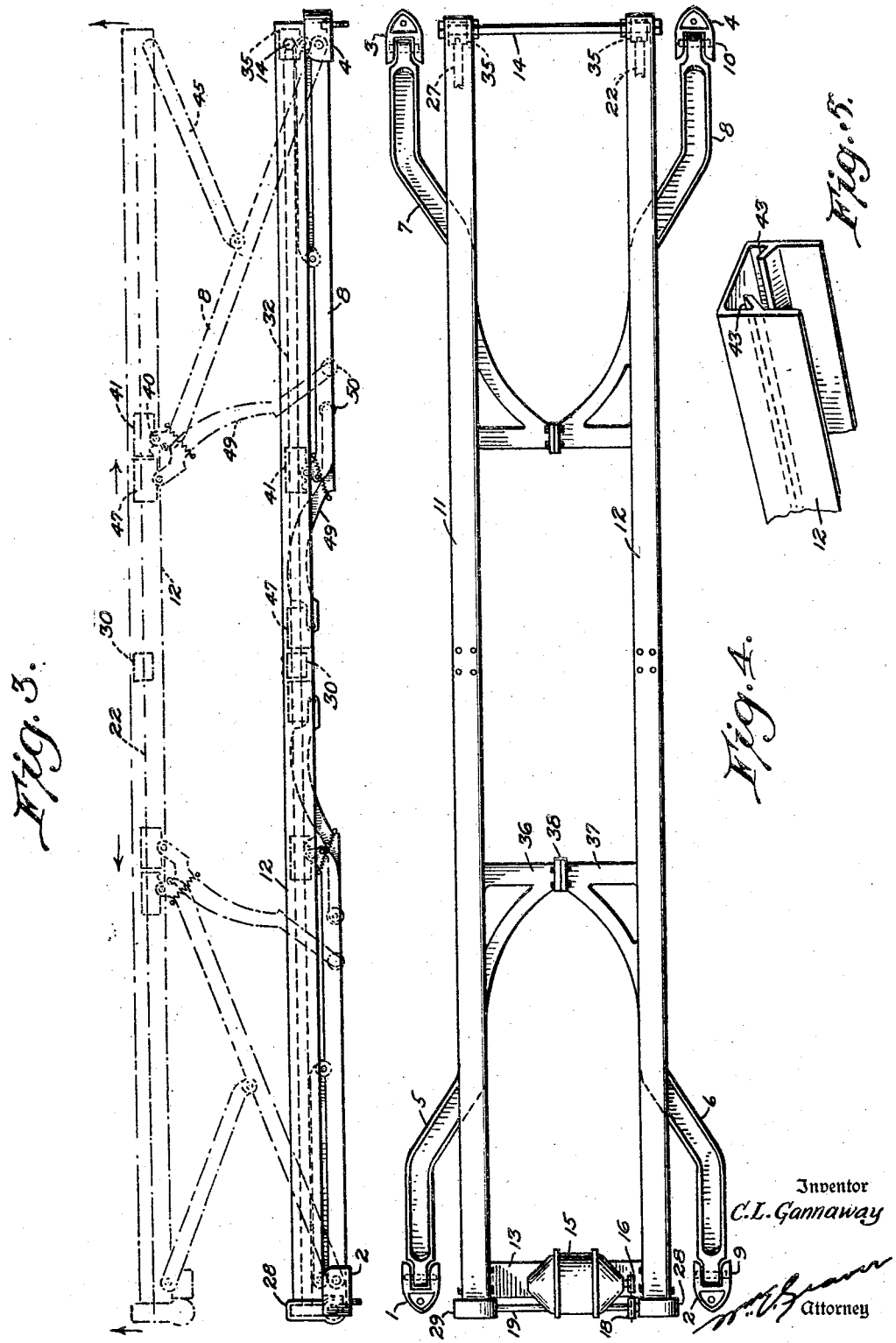

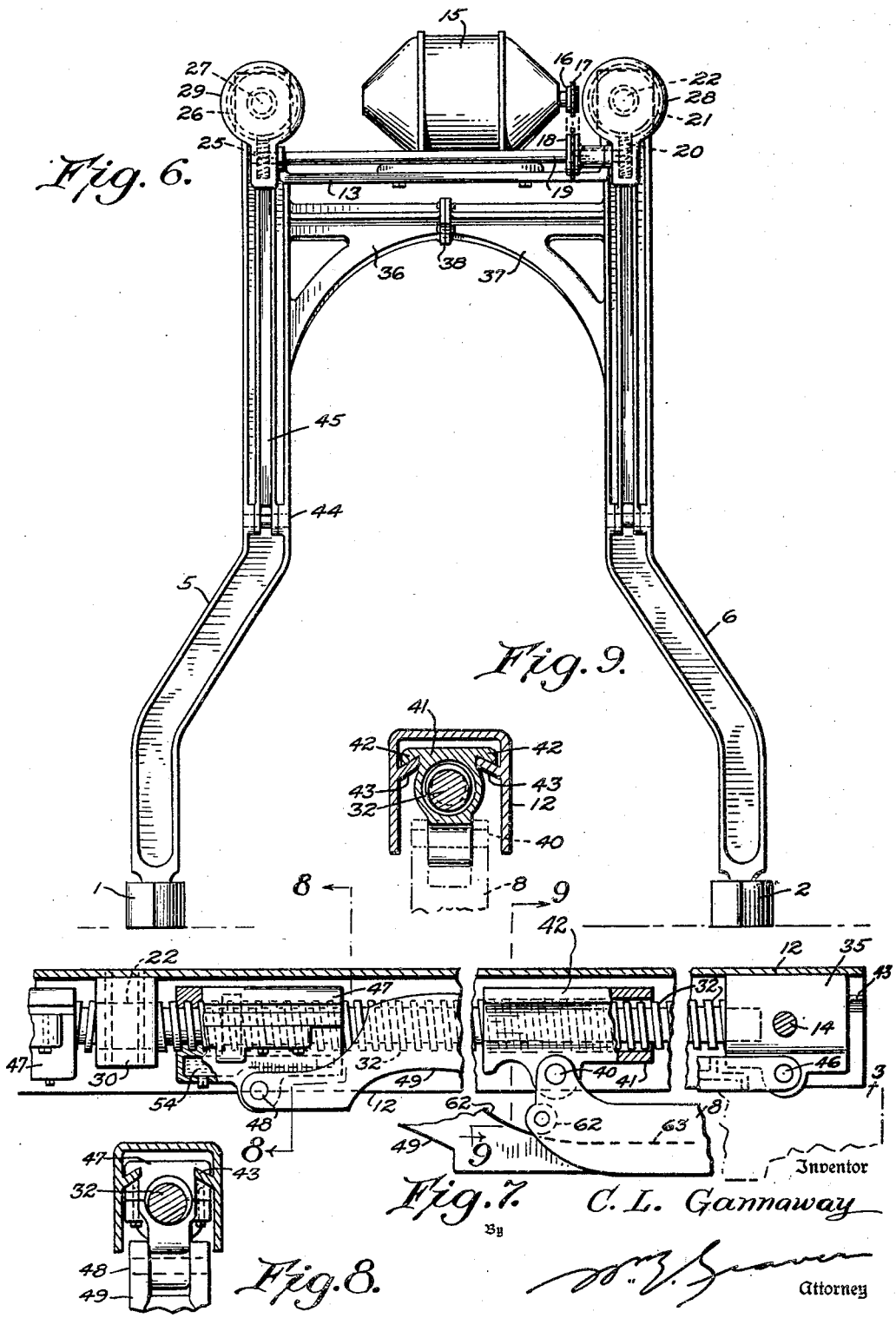

Patented Feb. 24, 1931

1,794,165

UNITED STATES PATENT OFFICE

CHARLES L. GANNAWAY, OF NORTH CHATTANOOGA, TENNESSEE, ASSIGNOR OF ONE-HALF TO W. C. AND D. J. CASEY, OF CHATTANOOGA, TENNESSEE

AUTOMOBILE LIFT

Application filed August 1, 1929. Serial No. 382,799.

This invention relates to automobile lifts and has for its object to provide a device which is simple in construction, less costly to manufacture, and more efficient in use than those heretofore proposed.

With these and other objects in view the invention consists in the novel details of construction and combinations of parts as will be more fully hereinafter disclosed and particularly pointed out in the claims.

Referring to the accompanying drawings forming a part of this specification in which like numerals designate like parts in all the views, Fig. 1 is a side elevational view of the device in substantially full raised position;

Fig. 2 is a perspective diagrammatic view illustrating the transfer of power for the purpose of raising the device;

Fig. 3 is a side elevational view of the device in collapsed or down position with a representation in dotted lines of the device in partially raised position;

Fig. 4 is a top plan view of the device;

Fig. 5 is a perspective detail of one of the channel members constituting a portion of the frame of the device;

Fig. 6 is an end elevation of the device in raised position;

Fig. 7 is a detail view partially in section illustrating some of the connections by means of which the device is raised and lowered;

Fig. 8 is a transverse sectional view taken as on the line 8—8 of Fig. 7 and looking in the direction of the arrows; and Fig. 9 is a transverse sectional view taken as on the line 9—9 of Fig. 7 and looking in the direction of the arrows.

The device includes foot blocks 1, 2, 3 and 4 each rigidly secured to the floor and adapted to receive the lower and outwardly flared ends of legs 5, 6, 7 and 8 which are pivotally secured to the foot blocks as indicated in Fig. 1 at 9 and 10. The device further includes a platform upon which the automobile is supported, said platform comprising two parallel frame members 11 and 12 spaced apart a distance equal to or less than the traction or gauge of the automobile. These members may be of any suitable construction although in the drawings they have been illustrated as inverted channel members the ends of which are rigidly interconnected as by the spacing elements 13 and 14 upon the former of which is mounted an electric motor 15 of the reversible type upon the end of the shaft of which is mounted a sprocket 16 driving a chain 17 which engages a second sprocket 18 mounted upon a shaft 19 extending transversely of the channels 11 and 12.

On one end of the shaft 19 is a gear 20 enmeshing with a second gear 21 mounted on the end of a shaft 22 supported in suitable brackets within the channel member 12. At the other end of the shaft 19 is a gear 25 enmeshing with a gear 26 mounted on the end of a shaft 27 supported in suitable brackets within the other channel member 11, the gears 20, 21 and the gears 25, 26 being suitably encased in housings as indicated at 28 and 29 respectively in Fig. 6. Each of the shafts 22 and 27 extends the full length of the channel members and for additional support there may be provided in each of the latter and midway thereof a supporting bearing such as indicated in Fig. 1 at 30.

The shafts 22 and 27 are rotated simultaneously at equal speeds in the same direction through the power transmission, and said shafts are threaded throughout a portion of their length to form worms. That is to say, the shaft 22 between the gear 21 and the middle supporting bearing is provided with right hand threads to form the worm 31, and between the said bearing 30 and the other end the shaft is provided with left hand threads to form the worm 32. Similarly, worms 33 and 34 are formed on the other shaft 27, the pitch of all the worms being the same. Thus it will be seen that the pairs of worms 31, 33 and 32, 34 will cause engaging nuts to travel simultaneously and equally toward or away from the center supporting bearing according to the direction of rotation of the shafts 22 and 27. In the drawings the outer ends of the shafts are shown supported in thrust bearing blocks such as 35 which are secured to the channel members.

Near the ends of the main legs opposite to the floor ends there are formed integral inwardly lateral extensions by means of which the legs are interconnected. That is to say, the leg 5 has the extension 36 and the adjacent leg 6 has the extension 37, both of said extensions being of a length to meet and form the bolted joint 38 midway between the channels 11 and 12. The other pair of legs 7 and 8 are similarly formed and joined resulting in a construction thwarting side sway or give of the device. The ends of the legs adjacent said extensions are pivotally connected as at 40 to a carriage 41 adapted to longitudinally slide over the threads of one of the worms above mentioned without threaded engagement therewith as illustrated in Fig. 9, and said carriage has extensions 42 adapted to slidingly engage tracks or shelves 43 formed on inner opposite faces of the channel member 12 to reduce frictional wear on the threads of the worm as the carriage is slid thereover. Each leg such as 8 is pivoted as at 44 at its midpoint to one end of a toggle lever 45 the other end of which is pivotally secured as at 46 to one of the blocks 35 in the channel member 12, the purpose of the member 45 appearing more fully hereinafter.

Engaging the threads of each worm is a nut generally indicated by the numeral 47 to which is pivotally secured as at 48 one end of an auxiliary leg 49 the other end of which carries a roller 50. The auxiliary leg is retained in close association with a main leg, such as 8, as by a tension spring 51 serving as a clamp with the aid of rods or rollers 52 and 53 as indicated in Fig. 1. The nut 47 is preferably made in two halves as shown in Fig. 8 and is hollow throughout a portion of its length to form a reservoir 54 for the reception of a lubricant. The sides of each nut are suitably kerfed to accommodate the shelves 43 above described. As the worm is rotated its associated nut will be forced as in the direction indicated in Fig. 3 and in this movement said nut will abut the carriage 41 and push it toward the outer end of the device. When this occurs the leg, such as 8, will be moved resulting in a raising of the device above the floor level, the leg in this movement as well as the channel member 12 being interbraced by the toggle 45. It will be understood from the foregoing that each of the four legs and their associated parts have duplicate construction and operate simultaneously. It will further be understood that the members 11 and 12 are intended in their upward movement to contact with the underside of the axles of the automobile and raise and support the latter to leave the wheels free.

Said leg, as will be seen from the drawings, has a bowed portion 60 one edge of which forms a cam surface 61 which is adapted to cooperate with a roller 62 carried by a leg, such as 8, at a point adjacent its pivot 40.

When the device is in collapsed or down position, as shown in Fig. 3 in full lines, the roller 62 will be resting upon the upper surface of the straight portion 63 of the auxiliary leg with the roller 50 thereof in engagement with the floor. After an automobile has been driven onto the device the motor 15 is started and the power is transmitted therefrom to the shafts 22 and 27 causing the worms to rotate as a result of which the nut 47 is moved to the right as seen in said figure, and this in turn causes a movement of the auxiliary leg 49 to the right. This movement forces the auxiliary leg under the roller 62 carried by the main leg, such as 8, but since the auxiliary leg has a bowed portion, said roller will ride upwardly over the curved cam surface 61 and thus raise the channel 12. The nut 47 is disposed inside of the channel and one end of the auxiliary leg is pivoted thereto as at 48, Figure 1. This causes this end of the auxiliary leg to raise with the channel, thereby giving a much greater lifting distance than the actual bowed part of the auxiliary leg. This arrangement of the auxiliary leg is such that the channel member will be raised sufficiently from off the floor to permit action by the toggle member 45. That is to say, when the nut 47 has moved to the right as seen in Fig. 3 to a point where it is ready to contact with the carriage 41, the roller 62 will have ridden over the cam surface 61 to the uppermost point thereon and this will have raised the channel member a distance of substantially two and one-half feet, thus placing the leg 8 at an angle to the floor. Thus the main leg such as 8, has been arisen to such a position as to fully and amply support its proportion of the weight of the channel members and its load.

The nut 47 then contacts with the carriage 41 in its continued movement and pushes the latter along over the worm 32, thus bringing a toggle action between toggle 45 and leg 8 thereby causing said leg to rise in a vertical direction resulting in a transfer of the load from the auxiliary legs to the main legs and raising the former clear of the floor. Since the toggle is connected to the extremity of the channel member said toggle serves additionally as a brace aiding in the support of the device and the automobile load thereon. Fig. 1 shows the device in completely raised position, the auxiliary leg being prevented from dropping into a truly vertical position by the spring clamp 51. Each main leg is preferably formed with a depression suitable for receiving the bowed portion of the auxiliary leg, see Figs. 1 and 2.

When the automobile has been raised to the required height, the power is shut off from the motor 15 to stop the rotation of the worms. When the automobile is to be lowered the motor is rotated in the opposite direction which gives reverse movement to the worms, and the nut 47 will then move from right to left as seen in Fig. 3. As this occurs the carriage 41 will follow the nut due to the weight of the device and its load. In the descent the roller 50 at the end of the auxiliary leg will reach the ground and then roll thereover, during which time the load will be transferred to a great extent to the auxiliary leg, the roller 62 associated with the main leg 8 again riding the cam surfaces 61. It will therefore be seen that the toggle plays an operative part only when the main leg is in position to support the load without undue strain upon the construction.

From the foregoing it will thus be seen that by this invention there is provided an automobile lift having in combination a platform consisting of the channels 11 and 12 adapted to be supported by the floor, foldable legs for raising and supporting said platform, said legs outwardly flared and pivotally secured at their lower ends to the floor whereby the platform is braced against lateral side sway, each leg having sliding engagement with said platform through the carriages 41, a brace 45 pivotally connecting each leg with said platform to secure the latter against longitudinal or endwise movement said brace or toggle being interposed between the platform and the legs to perform the secondary function to assist in the movement of said legs, and screw means comprising the worms and the nuts 47 the latter engaging the carriages 41 for moving the legs. It will also be seen that the channels 11 and 12 provide grooves within which the worms are disposed and that the nuts 47 threaded on said worms fit the channels to prevent a turning thereof and to insure longitudinal travel within the channel, and that the carriages 41 straddle the worms or jackscrews so that when engaged by the nuts they are slidable over said worms. Lastly, it will be seen that auxiliary means comprising the legs or members 49 are employed which are pivotally secured to the nuts 47 and provided with a cam surface for initially raising the platform from its support and which are adapted to receive the load of said lift before main legs 5. 6, 7 and 8 are brought into operative position to receive and ultimately carry said load. The entire device is self-contained, or in other words the entire power for actuating the device is carried by the platform.

It is obvious that those skilled in the art may vary the details of construction as well as arrangement of parts without departing from the spirit of the invention and therefore it is not desired to be limited to the foregoing except as may be required by the claims.

What is claimed is:—

1. In an automobile lift the combination of a platform including a member provided with a groove; a source of power on said platform; a jackscrew carried by said member adapted to be driven from said source; a nut threaded on said jackscrew and engaging the groove of said member for longitudinal travel therein; and a leg for raising and supporting said platform said leg pivotally secured at one end to a support and provided at its other end with a carriage straddling said jackscrew and engageable with said nut.

2. A lift for automobiles the same comprising a platform, legs foldably attached thereto, operating screws carried by said platform, and auxiliary means actuated by said screws for raising said platform to bring said legs into operative platform supporting position.

3. A lift for automobiles the same comprising a platform, legs foldably attached thereto, screw means for moving said legs, and auxiliary means actuated by said screw means for raising said platform to bring said legs into operative platform supporting position.

4. A lift for automobiles the same comprising a platform and a support therefor, a source of power on said platform, means for raising said platform including screws driven from said source of power, and auxiliary legs adapted to initially receive the load of said lift, and main legs secured to said support and foldable with respect to said platform said legs actuated by said means and adapted to ultimately receive said load.

In testimony whereof I affix my signature.

CHARLES L. GANNAWAY.